Sept. 6, 1938. T. SHIMAMOTO 2,129,594
ANIMAL TRAP
Filed Nov. 8, 1937 2 Sheets-Sheet 2
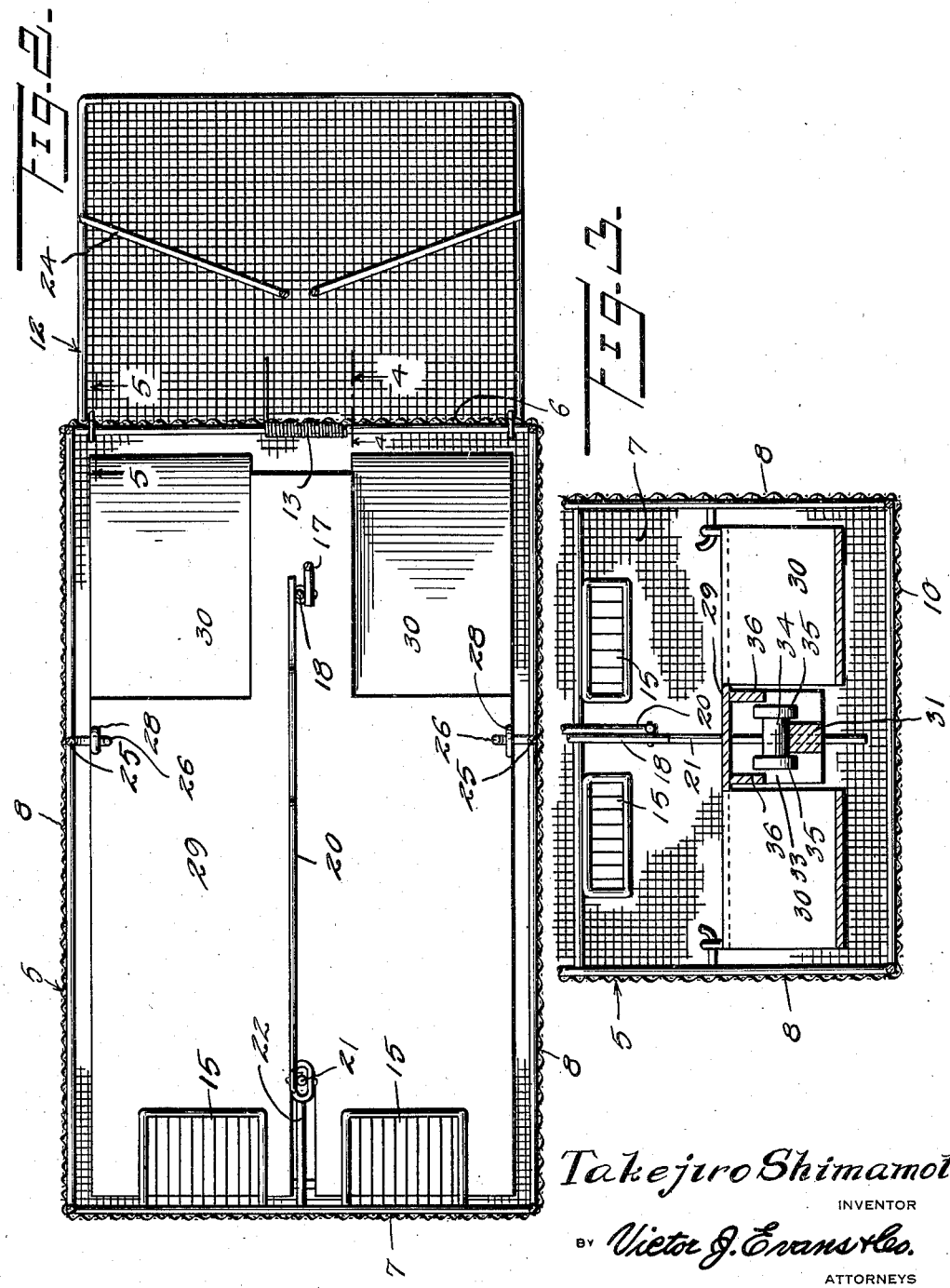
Takejiro Shimamoto
INVENTOR
BY Victor J. Evans & Co.
ATTORNEYS Patented Sept. 6, 1938

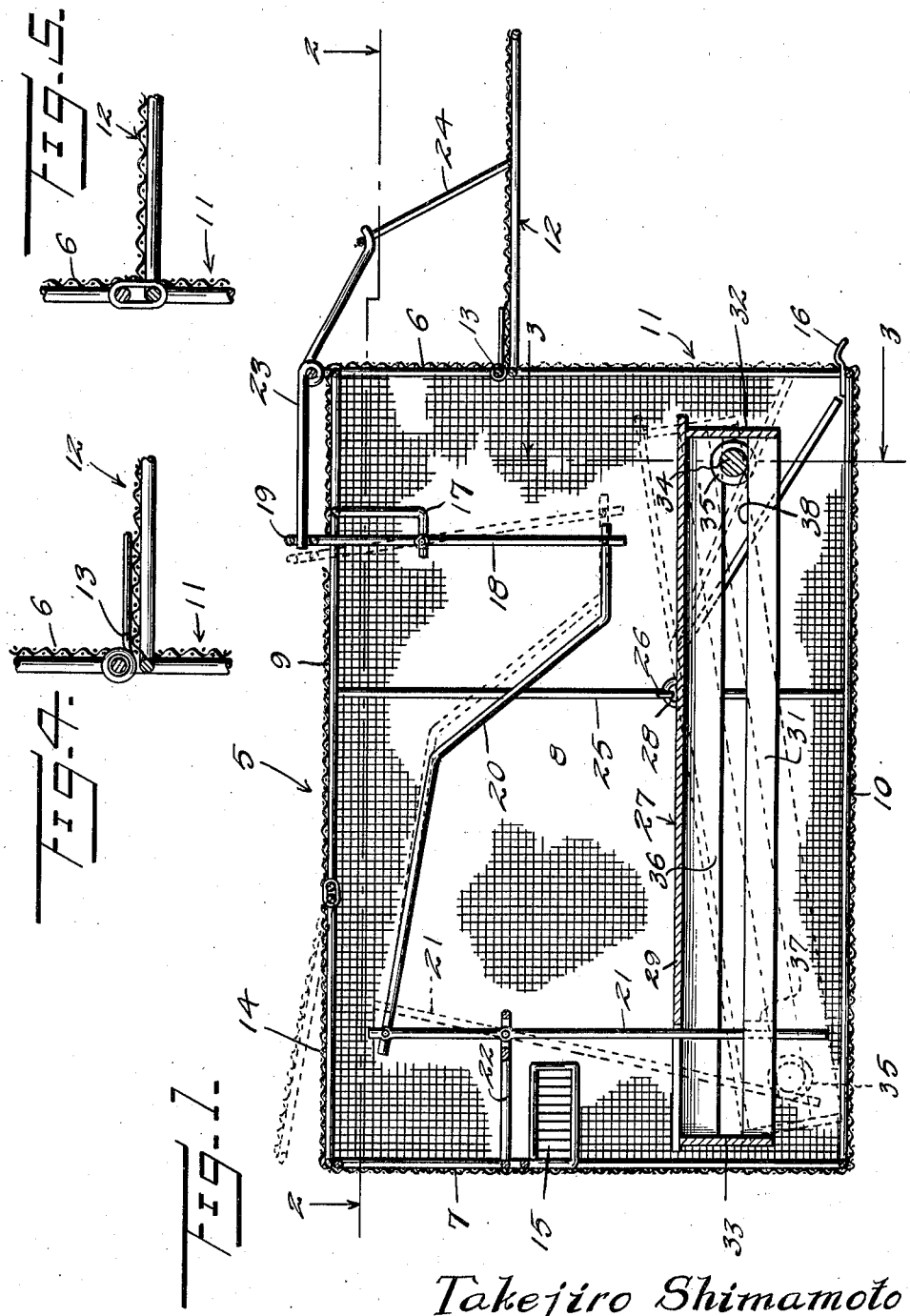

2,129,594

UNITED STATES PATENT OFFICE 2,129,594

ANIMAL TRAP

Takejiro Shimamoto, Hilo, Territory of Hawaii

Application November 8, 1937, Serial No. 173,463

1 Claim. (Cl. 43—61)

My invention relates to animal traps and more specifically to that class operated by the weight of the animal.

One of the principal objects of my invention is to provide an animal trap equipped with means for actuating the trip mechanism of the trap door by the weight of the animal.

Another object of my invention is to provide a trap of the above described character wherein the trip mechanism may be operated only after the animal has fully entered the trap.

A further object of my invention is to provide a trap of the above described character which is simple in construction, efficient in operation and durable in use.

Other objects and advantages will be apparent from the following description, appended claims and annexed drawings.

Referring to the drawings wherein like reference characters designate like parts throughout the several views:

Fig. 1 is a longitudinal section of my invention illustrating the same in set position.

Figures 2 and 3 are sectional views taken on the lines 2—2 and 3—3 of Figure 1, respectively.

Figures 4 and 5 are detail sectional views taken on the lines 4—4 and 5—5 of Figure 2, respectively.

My improved trap comprises a cage 5 having front, rear, side, top and bottom walls 6, 7, 8, 9 and 10 respectively. The walls are fashioned with longitudinal, transverse and vertical frame members connected together and preferably constructed of relatively stiff wire constituting a frame over which is secured latticed wire in the form of screening.

The front wall 6 is apertured to form a doorway 11 having a door 12 pivoted adjacent the top thereof adapted to be operated to a closed position by means of a coil spring 13 secured to one of the transverse frame members and connected to the door upon release of a trip mechanism hereinafter described.

The top wall 9 is provided with a hinged door 14 at the rear end thereof, normally maintained in a closed position and which is adapted to be opened for the purpose of removing an animal from the trap or placing food in the food boxes 15 secured to the rear wall 7. The bottom wall 10, adjacent the doorway 11, has secured thereto a latch 16 adapted to engage the lower frame member of the door 12 and maintain the door in closed position when the same has been released by the trip mechanism and actuated by the spring 13.

Secured to the longitudinally extending frame member forming the top of the frame is a depending bracket 17 having pivoted to the horizontally offset end thereof a trip rod 18, the upper end of which is formed with an eye 19 and the lower end pivoted to the front end of a connecting rod 20, the rear end of the connecting rod 20 being pivoted to the upper end of a trip actuating lever 21. The trip actuating lever 21 is pivoted intermediate of the length thereof to a horizontally extending support bracket secured to the rear wall 7 and the lower end of said lever extends downwardly for engagement with an actuating means hereinafter described.

The upper front end of the cage has pivoted thereto a trip arm 23, the rear end of which is positioned within the eye 19 of the rod 18 and the front end engaging a bail 24 pivotally connected to the door 12.

Between the rear and front walls of said cage and at a greater distance from the rear relative to the front is a pair of vertically extending support members 25, oppositely disposed on the side walls 8. Said members have secured thereto adjacent the lower end thereof transversely extending hooks forming hinged pintles 26 and supporting in pivoted condition a deck 27 by means of eyes 28 secured to said deck and engaging said pintles.

The deck comprises a platform 29 formed at the front end thereof with a pair of spaced ramps 30 extending downwardly towards the lower front edge of the cage, the lower ends of which engage the bottom wall 10 of the cage to limit the downward movement of the deck at the front thereof and laterally of the pintles 26. Intermediate of the ramps 30 there is provided a longitudinally extending rail 31 secured to the platform 29 in spaced relation by means of front and rear walls 32 and 33, respectively, over which is operable by means of gravity a roller 34 formed with side flanges 35 serving to guide said roller over said rail. Oppositely disposed flanges 36 fashioned on the platform 29 extend downwardly and embrace the roller 34 to prevent the same from dislodgement.

The rear end of the rail 31 is bifurcated to form a slot 37 through which the lever 21 passes and is adapted to operate. The front end of the rail is formed with a seat 38 on the top face thereof for receiving the roller 34 to maintain the same in set position, thereby positioning the deck in horizontal or set position.

In operation, the parts being in the set position illustrated in Figure 1 of the drawings, an animal upon entering the cage through the doorway 11 passes up one of the ramps 30 and onto the horizontal platform 29 towards the rear end thereof. As the animal passes through the plane of the pintles 26 the weight of the animal will cause the rear end of the deck to pivot downwardly, thereby dislodging the roller 34 from the seat 38 and causing the same to gravitate over the rail 31 and engage the lower end of the lever 21. Engagement of the lower end of the lever 21 by the roller 34 serves to pivot said lever and, through the medium of the connecting rod 20, actuates the rod 18 thereby releasing the rear end of the trip arm 23 from the eye 19. Release of the trip arm 23 causes the spring 13 to close the door 12 and thus entrap the animal within the cage. The trap may be reset for trapping another animal by raising the door 12, positioning the bail 24 over the front end of the trip arm 23, and moving the upper end of the rod 18 forward whereby the eye 19 engages the end of the arm 23. The movement of the rod 18 serves to position the lever 21 in set position through the medium of the connecting rod 20, the deck having been moved to a horizontal or set position upon opening of the door 12.

While I have shown and described the cage as being constructed of wire, it is to be distinctly understood that the same may be fashioned from other desirable material.

What I claim is:

A device of the character described, comprising, a cage having a door, a deck pivoted within said cage, trip mechanism carried by said cage and connected to said deck and said door, and a gravity operated roller disposed on said deck and adapted for engagement with said trip mechanism whereby to close said door.

TAKEJIRO SHIMAMOTO.